United States Patent
Tiefenau

[11] 3,888,754
[45] June 10, 1975

[54] OZONE MEASURING CELL

[75] Inventor: Helmut Karl Ernst Tiefenau, Gottingen-Weende, Germany

[73] Assignee: Max-Planck-Gesellschaft ZUR Forderung der Wissenschaften e. V., Gottingen, Germany

[22] Filed: Nov. 8, 1973

[21] Appl. No.: 414,613

[30] Foreign Application Priority Data
Nov. 9, 1972 Germany............................ 2254858

[52] U.S. Cl............................................ 204/195 R
[51] Int. Cl. ........................................... G01n 27/46
[58] Field of Search............ 204/1 T, 195 R; 324/29

[56] References Cited
UNITED STATES PATENTS

| 3,428,542 | 2/1969 | Komhyr............................... 204/1 T |
| 3,639,830 | 2/1972 | Harnoncourt................... 204/1 T X |

OTHER PUBLICATIONS

Victor H. Regener, "Automatic Ozone Recorder, Small Model," Univ. New Mexico, pp. 1–5, Figs. 1 & 2, (1956).

Primary Examiner—G. L. Kaplan
Attorney, Agent, or Firm—Burgess, Dinklage & Sprung

[57] ABSTRACT

Ozone containing gas is conducted through a measuring chamber containing a potassium iodide solution. Electrodes connectable by means of a direct voltage source are dipped into two electrode chambers, said electrode chambers being connected merely by a communicating capillary tube. The stream flowing between the electrodes due to the reaction between ozone and potassium iodide constitutes a measure for the ozone concentration in the gas.

7 Claims, 2 Drawing Figures

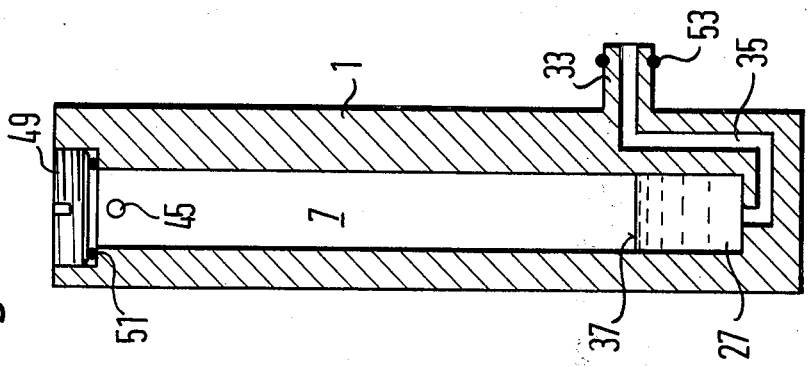
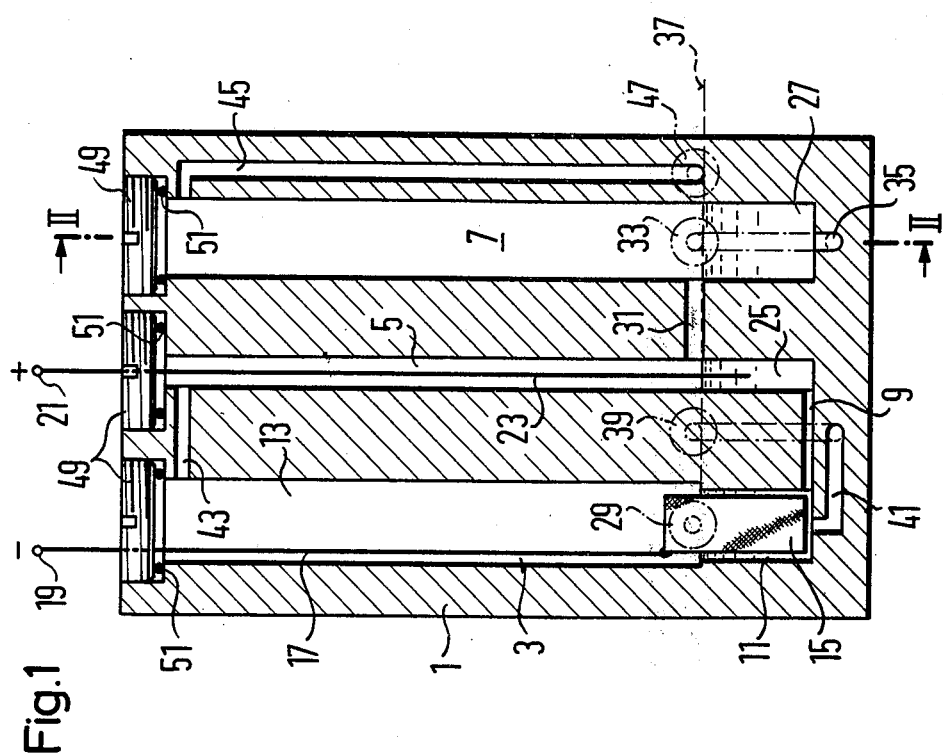

OZONE MEASURING CELL

The present invention relates to an ozone measuring cell comprising a measuring chamber which may be scavenged by an ozone-containing gas and comprising a cathode and an anode arranged within said chamber in such a manner as to be successively circulated in that order by a potassium iodide reaction solution.

The ozone-containing gas may be atmospheric air in the first place; knowledge of its ozone content has become of great importance in connection with stratosphere research.

A known method of showing track-shaped ozone consists in introducing it into a solution containing potassium iodide, wherein it reacts in compliance with the equation

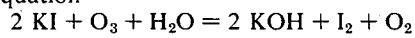

forming free iodine as well as potassium leach, and oxygen. If two electrodes are dipped into the reaction solution, to which a polarizing direct voltage is applied, the neutral iodine molecules formed during reaction will travel to the cathode due to nondirective molecular diffusion, in order to take up two electrons at said cathode. At the same time, two iodine ions are discharged from the reaction solution at said anode which will then go into solution as molecular iodine. The stream thus flowing between the cathode and the anode is with quantitative reaction a measure for the ozone content of the introduced air.

An ozone measuring cell has been known from "Proceedings of Royal Meteorological Society" A 256, pages 470 – 495, 1960 referred to by A. W. Brewer and J. R. Milford, which operates in accordance with the above method. An anode loop and a cathode winding of platinum wire are provided on a horizontally arranged glass rod in the longitudinal direction thereof, the cathode winding being positioned above the anode loop. Potassium iodide containing reaction solution flows from a storage container which is provided above said glass rod along the surface of the glass rod across the cathode winding and the anode loop. In this way, the created potassium leach will be removed from the ozone measuring cell. A glass tube is provided around said glass rod in such a way that a created annular gap will form a measuring chamber through which the ozone-containing air is conducted and may react with the reaction solution.

It is a disadvantage of this known ozone measuring cell that the molecular iodine formed at the anode loop can rediffuse to the cathode and will there adulterate the measured value by integration. Moreover, the air supplied to the measuring chamber will only insufficiently be mixed with the reaction solution.

Therefore, it is an object of the present invention to improve the above ozone measuring cell in such a manner that rediffusion of iodine molecules from the anode to the cathode is prevented.

This problem is solved by means of the present invention in that the measuring chamber includes a cathode chamber containing the cathode and an anode chamber separate from said cathode chamber containing the anode; and that the cathode chamber is connected to the anode chamber by a communicating capillary tube. In this way, it is not only possible to adapt the cathode chamber as well as the anode chamber to the conditions of reaction separately, but rediffusion of iodine molecules from the anode chamber into the cathode chamber is prevented at the same time due to the capillary tube.

To achieve even scavenging of the measuring chamber by the reaction solution, formation of a reaction solution sump must be prevented. This is suitably achieved by applying the capillary tube at the lower end of the cathode chamber and/or of the anode chamber.

Response time of the measuring cell is determined by the speed of diffusion of the iodine molecules to the cathode. Response time will be reduced if the ozone-containing gas may be supplied at the lower end of the cathode chamber, since then the circulating air will be whirled with the reaction solution. Since movable parts are not necessary for whirling, lifetime of the measuring cell will be considerably increased. Whirling will reduce response time considerably, i.e. approx. by factor $10^{-5}$.

After circulating the cathode chamber, the air will be free of ozone due to quantitative reaction of the ozone and the reaction solution and could be removed from the cathode chamber immediately. However, the cathode chamber is suitably provided with a cathode reaction chamber which may at the top continue by a cathode separating chamber. Iodine molecules draged along by the circulating air will fall back into the cathode reactor chamber and contribute to the measured value. The reaction solution will in this connection be suitably supplied across a supply stub which leads into the cathode chamber between the cathode reaction chamber and the cathode separating chamber. In this way, separation of the escaping air is not obstructed.

In a suitable embodiment of the invention, the anode chamber is connected to the cathode separating chamber across a channel supplying air thereto and is connected to a separating chamber across a channel discharging air and the reaction solution therefrom. By mixing again air and reaction solution in the anode chamber, a more even discharge of the reaction solution from the anode chamber is achieved, as well as a more continuous flow of reaction solution from the cathode chamber to the anode chamber. Separation in said cathode separating chamber will be least impaired if the channel supplying air to the anode chamber is applied at the upper end of the cathode separating chamber.

With small quantitites of reaction solution circulating the measuring chamber, the reaction solution level will extend at about the level of the supply stub leading into the cathode chamber. It is advantageous if the channel discharging air and the reaction solution from the anode chamber extend at the same level as the supply stub. The air supplied again to the anode chamber will then have to overcome only little differences of pressure and will hardly mix during discharge of the reaction solution from the anode chamber with the reaction solution.

The separating chamber is suitably constructed in such a way that the reaction solution may be pumped off at the lower end and the air at the upper end. In this way, a reaction solution sump will be avoided on the one hand and on the other hand, the air will be separated best. This will be important all the more since reaction solution contains potassium leach formed during reaction which leads to corrosion damage. The ozone measuring cell suitably constitutes a closed system. The cathode chamber, the anode chamber and the separating chamber are constructed in a gas-tight manner. In this way, it is possible to suck the air to be examined through the ozone measuring cell instead of pressing it through. In this way, air penetration through the ozone measuring cell can be effected by means of any pump, as the ozone will react with the reaction solution without having to flow through the pump. In a simple embodiment, the cathode chamber, the anode chamber and the separating chamber are formed by cylindrical blind holes in a block housing, the free openings of said blind holes being closed by screw plugs. In this embodiment, the cathode and the anode may be simply inserted. In addition, the blind holes can be easily cleaned.

A platinum net is suitably employed as cathode which may in a simple manner be constructed and dimensioned in such a way that all of the iodine molecules are ionized. To save costs, a single platinum wire is used as anode in contrast thereto.

An embodiment of the present invention will now be described with reference to the accompanying drawings, wherein FIG. 1 shows a cut through an ozone measuring cell, and FIG. 2 shows a cross-section along the line II—II of the ozone measuring cell of FIG. 1.

Positioned side by side are provided a cathode chamber 3, an anode chamber 5 and a separating chamber 7 within a block housing 1. The lower ends of the cathode chamber 3 and the anode chamber 5 are at the same level and are connected by a capillary tube 9. A lower region of the cathode chamber 3 serves as cathode reaction chamber 11 which continues to the upper region of the cathode chamber 3 as cathode separating chamber 13. A tubular cathode 15 consisting of a platinum net is inserted in the cathode reaction chamber 11. The cathode 15 is connected to a negative pole clamp 19 across a connecting wire 17. An anode 23 of platinum wire is connected to a positive pole clamp 21. The anode 23 extends into an anode reaction chamber 25 at the bottom region of the anode chamber 5.

The cathode reaction chamber 11, the anode reaction chamber 25, and a tub 27 in the lower region of the separating chamber 7 may be filled by potassium iodide containing reaction solution. The reaction solution may be supplied across a connector stub 29 ending in the cathode chamber 3 between the cathode reaction chamber 11 and the cathode separating chamber 13. The anode reaction chamber 25 and the tub 27 are connected by a connecting channel 31 at the level of the connector stub 29. At the bottom of the tub 27, a channel 35 leads to a discharge stub 33 again arranged at the same level as the connecting stub 29. As the connecting stub 29, the connecting channel 31 and the discharge stub 33 are at the same level, slow circulating speeds of the reaction solution may be set. With low circulating speed, level 37 of the reaction solution will reach little above a lower edge of the connecting stub 29 or of the connecting channel 31 resp. and of the discharge stub 33. As the channel 35 ends at the bottom surface of the tub 27, used reaction solution will be continuously removed without forming a reaction solution sump in the tub 27. The ozone containing air will be supplied across an entry stub 39 and a supply channel 41 at the lower side of the cathode reaction chamber 11. During circulation of the reaction chamber 11 it mixes in a whirling manner with the reaction solution contained therein. In the adjoining cathode separating chamber 13, it will be freed of reaction solution droplets which have been draged along and conducted at the upper side of the cathode separating chamber 13 across an air channel 43 into the anode chamber 5.

The air flows through the anode chamber 5 up to the anode reaction chamber 25 where it reaches, together with the reaction solution flowing out of the anode reaction chamber 25, the separating chamber 7 across the connecting channel 31. By again mixing air and the reaction solution in the anode chamber 5 a more even discharge of the reaction solution from the anode reaction chamber 25 will be achieved and thus a more continuous flow of the reaction solution from the cathode reaction chamber 11 to the anode reaction chamber 25. In the separating chamber 7, droplets dragged away from the reaction solution will be separated. It will be prevented in this way that the used reaction solution containing potassium leach will cause corrosion damage at other devices in the neighbourhood. An air outlet channel 45 ending at the upper end of the separating chamber 7 leads to a suction stub 47, to which a suction pump may be connected. The ozone measuring cell shown in FIGS. 1 and 2 is constructed as a closed system. The cathode chamber 3, the anode chamber 5 and the separating chamber 7 are to the top each sealed by means of screw plugs 49 and sealing rings 51. In this way, it is possible to suck the ozone-containing air which is to be examined through the ozone measuring cell instead of pressing it through. Thus, the selection of a suitable suction pump is not critical since the entire ozone reacts with potassium iodide before reaching the suction pump. Losses of air or reaction solution are prevented by sealing means 53 at the suction stub 47, at the entry stub 39, at the outlet stub 33 and at the connecting stub 29.

To operate the ozone measuring cell a direct voltage of about 180mV is applied at the negative pole clamp 19 and at the positive pole clamp 21 for polarization. Current flowing between the negative pole clamp 19 and the positive pole clamp 21 whilst ozone-containing air is introduced, will then be proportional to the ozone concentration. The region to be measured may be varied by the concentration of the reaction solution, the reaction solution penetration and additionally, by the air penetration which corresponds to the ozone quantity turned over per time unit. For ozone concentrations of 0–150 micro grams of ozone per cubic meter of air and a pumping capacity of 1 cubic centimeter per second, a circulation of ⅓ litre of 2 percent potassium iodide solution in 24 hours will be sufficient. Overincrease of the measured value by rediffusion from the anode reaction chamber 25 to the cathode reaction chamber 11 contains at room temperature only about 2 percent of the measured value. Rediffusion is approximately proportional to the cross-section of the capillary tube 9 and may be reduced by increasing the reaction solution penetration or by decreasing the smallest cross-section of the capillary tube 9 possible. In the embodiment described above, the capillary tube 9 has a diameter of 1 mm. The setting time (90 percent) is about 75 seconds. The ozone measuring cell described is particularly suited for continuous automatic measurement of the ozone content.

What is claimed is:

1. Ozone measuring cell comprising:

a. a measuring chamber which may be flushed by an ozone-containing gas;

b. a cathode and an anode arranged within said chamber in such a manner that potassium iodide reaction solution passes continuously from cathode to anode;

c. said measuring chamber including a cathode chamber which contains said cathode and an anode chamber separate from said cathode chamber which contains said anode;

d. said cathode chamber being connected to said anode chamber by a capillary tube;

e. means for supplying ozone-containing gas to the lower end of said cathode chamber;

f. said cathode chamber being divided into a reaction portion and a separating portion thereabove;

g. means for supplying said reaction solution to said cathode chamber at a point between the reaction and separating portions thereof;

h. a separating chamber positioned next to said anode chamber;

i. said cathode and anode chambers and said separating chamber being constructed in an airtight manner;

j. means connecting said anode chamber with the separating portion of said cathode chamber and adapted to supply a gas thereto;

k. means connecting said anode chamber with said separating chamber and adapted to discharge gas from said anode chamber; and l. means for removing said reaction solution from said separating chamber at the upper liquid surface level thereof.

2. Ozone measuring cell of claim 1 wherein said capillary tube connecting said cathode and said anode chambers is positioned at the bottom end of said cathode chamber and/or said anode chamber.

3. Ozone measuring cell of claim 1 wherein the means connecting said anode chamber with the separating portion of said cathode chamber is positioned at the upper end of said cathode chamber.

4. Ozone measuring cell of claim 1 wherein the means connecting said anode chamber and said separating chamber is positioned at the same level as said means for supplying said reaction solution to said cathode chamber.

5. Ozone measuring cell of claim 1 wherein said cathode, anode and separating chambers are cylindrical chambers in a block housing each of which is closed off by screw plug means.

6. Ozone measuring cell of claim 1 wherein said cathode is a platinum net.

7. Ozone measuring cell of claim 1 wherein said anode is a platinum wire.

* * * * *